UNITED STATES PATENT OFFICE.

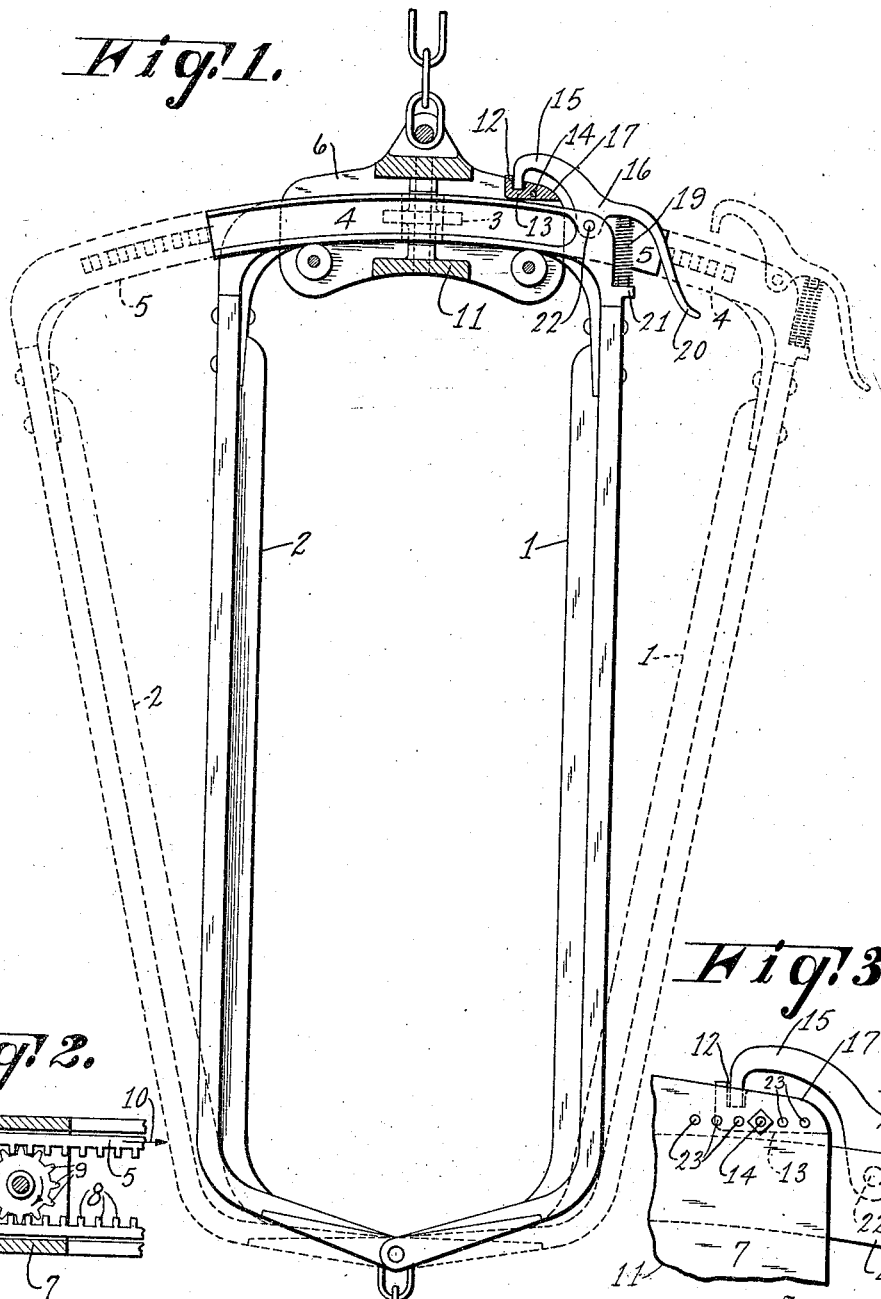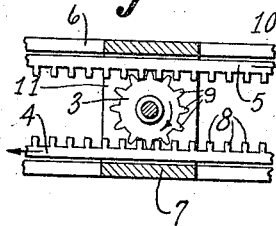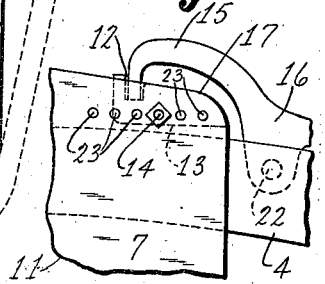

WILLIAM GUTENKUNST, OF MILWAUKEE, WISCONSIN.

CATTLE-STANCHION.

1,235,683.  Specification of Letters Patent.  Patented Aug. 7, 1917.

Application filed October 18, 1915. Serial No. 56,408.

*To all whom it may concern:*

Be it known that I, WILLIAM GUTENKUNST, a citizen of the United States, residing at the city of Milwaukee, county of Milwaukee, and State of Wisconsin, have invented new and useful Improvements in Cattle-Stanchions, of which the following is a specification.

My invention relates to improvements in cattle stanchions, and it pertains, more especially among other things, first, to the mechanism for simultaneously inclining both members of a pair of stanchions one toward the right and the other toward the left by manually moving one of the bars of said stanchions, and for simultaneously bringing both of said bars back to the vertical by moving one of such bars; second to the device for locking both of said stanchions in their closed or vertical position, and third, to the device for so adjusting the locking mechanism of a pair of stanchions that their upper ends may always, when locked, be secured at a greater or less distance apart corresponding to the width or size of the neck of the animal held thereby.

My invention is further explained by reference to the accompanying drawings, in which—

Figure 1 represents a front view thereof, the position of the movable members of the stanchions when inclined or thrown apart being indicated by dotted lines.

Fig. 2 is a plan view, part in section of the device for simultaneously moving one of the stanchion bars toward the right and the other toward the left by manually moving one of said bars.

Fig. 3 represents a side view of the mechanism for locking said stanchion bars at any desired point of adjustment.

Like parts are identified by the same reference numerals throughout the several views.

By the device shown in Fig. 1 motion is communicated from the inclinable stanchion bar 1 to the inclinable stanchion bar 2 through the pinion 3 and tooth bars 4 and 5. The stanchion bar 1 is rigidly connected with the tooth bar 4 and the tooth bar 4 is slidably supported between the members 6 and 7 upon the respective sides of the pinion 3, whereby as the stanchion 1 is moved from the inclined position indicated by dotted lines in Fig. 1 to that shown by full lines in said figure the teeth 8 of said bar are caused to mesh with the teeth 9 of the pinion, whereby said pinion 3 is revolved from left to right, as indicated by the arrow in Fig. 2, and whereby as said pinion 3 is revolved from left to right the tooth bar 5 is caused to move toward the right, as indicated by the arrow 10, and whereby the stanchion bar 2 is moved from the inclined position indicated by dotted lines in Fig. 1 to the vertical position shown by full lines in said figure.

Thus, it is obvious that as one of the bars of the stanchions is moved toward the right or left motion will be communicated therefrom to the other bar 2 through the two bars 4 and 5 and pinion 3, whereby both of said stanchion bars are simultaneously opened and closed. The upper ends of the bars 1 and 2 are guided in their movement toward and from each other, as described by the tooth bars 4 and 5 and said tooth bars 4 and 5 are slidably retained in place between the retaining bearings 6 and 7 of the bracket or suspension member 11. The bracket 13 is provided with a recess 12, and said bracket 13 is adjustably connected with the bracket 11 by the pin 14. Thus, it is obvious that as the stanchion 1 is brought to the vertical the upper arm 15 of the dog or two armed lever 16 is caused to slide over the inclined bearings 17 of said bracket until it reaches the notch or recess 12 of said bracket when it drops therein and thereby retains the stanchion 1 in its vertical position shown, while the opposing stanchion bar 2 is brought to the vertical position and thus held by the action of the tooth bar 4 upon the pinion 3 and the action of the pinion 3 on the tooth bar 5. 19 is a spiral spring which is interposed between the handle 20 and the shoulder 21 of the stanchion bar 1, and said member 20 is raised by the recoil of said spiral spring 19, whereby the upper end of the dog 16 is forced into the notch 12 of said bracket, and whereby both of said stanchion bars 1 and 2 are securely retained in their locked position. The dog 16 is pivotally connected with the side of the tooth bar 4 by the pivotal bolt 22. The bracket 13 may be adjusted toward the right and left and secured at any desired point of adjustment corresponding with the distance between the several bolt holes 23 by the retaining bolt or pin 14, whereby the upper end of the stanchions may at all times be retained at any desired point of adjustment corresponding with the size or thickness of the neck of the cattle retained in place by said bars.

Having thus described my invention what I claim as new and desire to secure by Letters Patent, is:—

1. In a device of the described class, the combination with each of the stanchion bars of a pair of inclinable stanchions, of a toothed bar, a pinion located between said toothed bars and having its teeth meshed with the teeth of both of said toothed bars, whereby a single pair of stanchions only may be operated at a time, a suspension bracket inclosing the overlapping ends of both of said toothed bars, provided with a plurality of bolt receiving apertures, an adjustable bracket provided with a single recess for the reception of a dog pivotally connected with one of said inclinable stanchion bars, said last named bracket being adapted to be adjusted horizontally in connection with said suspension bracket at short intervals corresponding with the distance between the apertures in said suspension bracket, a bolt adapted to be inserted in an aperture formed in said adjustable bracket and through one of the apertures of said suspension bracket, whereby said inclinable members are adapted to be secured nearer to or farther from each other.

2. In a device of the described class, the combination with each of the bars of a pair of inclinable stanchions, of a horizontally disposed toothed bar, a horizontally disposed pinion, the teeth of which are adapted to mesh with the teeth of said horizontally disposed toothed bars, a suspension bracket inclosing the overlapping ends of both of said bars, an adjustable bracket rigidly connected with said suspension bracket, said adjustable bracket being provided with a recess, a dog pivotally connected with one of said inclinable stanchion bars, the upper end of said dog being adapted to engage in said recess, whereby said stanchion bars are adapted to be locked in their closed position, all substantially as and for the purpose specified.

In testimony whereof I affix my signature in the presence of two witnesses.

WILLIAM GUTENKUNST.

Witnesses:
Jas. B. Erwin,
Irma D. Bremer.

Copies of this patent may be obtained for five cents each, by addressing the "Commissioner of Patents, Washington, D. C."